United States Patent [19]

Higashijima et al.

[11] Patent Number: 5,397,462
[45] Date of Patent: Mar. 14, 1995

[54] FILTER WITH LATERALLY REMOVABLE ELEMENT AND VALVE MEANS

[75] Inventors: Harumi Higashijima, Fukuoka; Fumiya Kitayama, Kasuga; Shinji Suematsu, Fukuoka, all of Japan

[73] Assignee: Matsushita Electric Industrial Co., Ltd., Osaku, Japan

[21] Appl. No.: 111,348

[22] Filed: Aug. 24, 1993

[51] Int. Cl.$^6$ ............................................. B01D 27/08
[52] U.S. Cl. .................................. 210/136; 210/232; 210/234; 210/447
[58] Field of Search ............... 210/232, 234, 282, 447, 210/97, 100, 136, 445, 446

[56] References Cited

U.S. PATENT DOCUMENTS

| | | | |
|---|---|---|---|
| 3,069,015 | 12/1962 | Hultgren et al. | 210/232 |
| 3,085,688 | 4/1963 | Eberle | 210/232 |
| 3,240,342 | 3/1966 | Callahan, Jr. et al. | 210/232 |
| 3,447,687 | 6/1969 | Cantebury | 210/447 |
| 3,628,662 | 12/1971 | Kudlaty | 210/234 |
| 4,759,842 | 7/1988 | Frees et al. | 210/232 |
| 5,017,285 | 5/1991 | Janitz et al. | 210/232 |
| 5,092,990 | 3/1992 | Muramatsu et al. | 210/136 |
| 5,108,598 | 4/1992 | Posner | 210/447 |
| 5,215,655 | 6/1993 | Mittermaier | 210/234 |
| 5,242,581 | 9/1993 | Mohr | 210/136 |
| 5,281,330 | 1/1994 | Oikawa et al. | 210/136 |

Primary Examiner—Robert A. Dawson
Assistant Examiner—Robert James Popovics
Attorney, Agent, or Firm—Panitch Schwarze Jacobs & Nadel

[57] ABSTRACT

A water filter has a side wall member provided with an inflow port and an outflow port and has a cartridge mounting base, which is turnably borne to the near-bottom part of said side wall member; and a cartridge is detachably installed in said side wall member on said cartridge mounting base in a manner that the inflow port of said side wall member and the inflow port of said cartridge are connected and further the outflow port of said side wall member and the outflow port of said cartridge are connected.

6 Claims, 9 Drawing Sheets

FILTER WITH LATERALLY REMOVABLE ELEMENT AND VALVE MEANS

FIELD OF THE INVENTION AND RELATED ART STATEMENT

1. Field of the Invention

This invention relates to a filter for water and, more particularly, to a cartridge type water filter.

2. Description of the Related Art

In recent years, quality of the city water becomes poor owing to environmental pollutions in the upstream district and midstream area of river. Accordingly many homes become to provide water filter(s) at city water outlet(s) in kitchen and/or toilet.

A typical conventional filter will be explained with reference to FIG.10.

In a cylinder portion 90 of the filter, a substantially circular cylindrical upper cover member 92 is mounted on the upper end of a side wall member 91 of a substantially cylindrical shape, and also a substantially circular cylindrical lower cover member 93 is fixed to the lower end of the side wall member 91.

The upper cover member 92 is provided with an opening 92a on its upper face and also with an opening 92b on its lower face. Both these openings 92a and 92b communicate with each other by a tubular channel 92c in the upper cover member 92.

The lower cover member 93 is provided with an opening 93a in its side portion and with an opening 93b in its upper portion. Both these openings 93a and 93b communicate with each other by a tubular channel 93c in the lower cover member 93.

The openings 92a, 92b, 93a and 93b have respective cylindrical protruding portions 94, 95, 96 and 97 which extend from their respective edges toward outsides of both the channels. To the protrusion 97 is fixed a tube 98 which flows raw water into a housing; and to the protrusion 94 is fixed a tube 99 which flows filtered water outside the housing.

A cartridge 100 containing a known filter member is provided with, on its upper and lower ends, cylindrical protruding portions 102 and 101, which are a filtered water outflow part and a raw water in flow part, respectively. The raw water inflow part is to be connected to a city water outlet e.g. a faucet in the kitchen.

When the cartridge 100 is installed in the interior of the cylinder 90, the upper cover member 92 is removed, and the cartridge 100 is so inserted into the cylinder 90 that the protrusion 96 of the lower cover member 93 fits into the protrusion 101 of the cartridge 100. Then the upper cover member 92 is so installed in the cylinder 90 that the protrusion 95 of the upper cover member 92 fits into the upper end protrusion 102 of the cartridge 100.

When a used cartridge 100 is replaced with a new one, first the upper cover member 92 is removed, and the used cartridge is taken out from the cylindrical side wall member 91.

However, there was a problem in this case that raw water and filtered water left in the cartridge leak from the lower end protrusion 101 of a used cartridge.

OBJECT AND SUMMARY OF THE INVENTION

The object of the present invention is to provide a filter which can prevent a cartridge from leaking water when replacing the cartridge containing a filter member.

A filter of the present invention comprises: a housing having an inflow port and an outflow port; a cartridge which houses a filter member and has an inflow port for flowing in raw water at the lower end of said cartridge and an outflow port for flowing out filtrated water by said filter member in the upper end of said cartridge; said cartridge is detachably installed in said housing in a manner that the inflow port of said housing and the inflow port of said cartridge are coupled and further the outflow port of said housing and the outflow port of said cartridge are coupled.

A filter in accordance with the present invention further comprises: a channel; valve means which is provided in said channel for preventing water from flowing from an up side position to a down side position; and cartridge mounting means for making such detachable coupling that an inflow port of said cartridge and an output port of said channel are coupled at the up side part of said valve means, and further, the inflow port of said housing and the inflow end of said channel are coupled at a down side of said valve means.

It will be recognized that some or all of the Figures are schematic representations for purposes of illustration and do not necessarily depict the actual relative sizes or locations of the elements shown.

DESCRIPTION OF TIM PREFERRED EMBODIMENTS

Preferred embodiments of the present invention will be explained with reference to the accompanied drawings.

Figure 1:
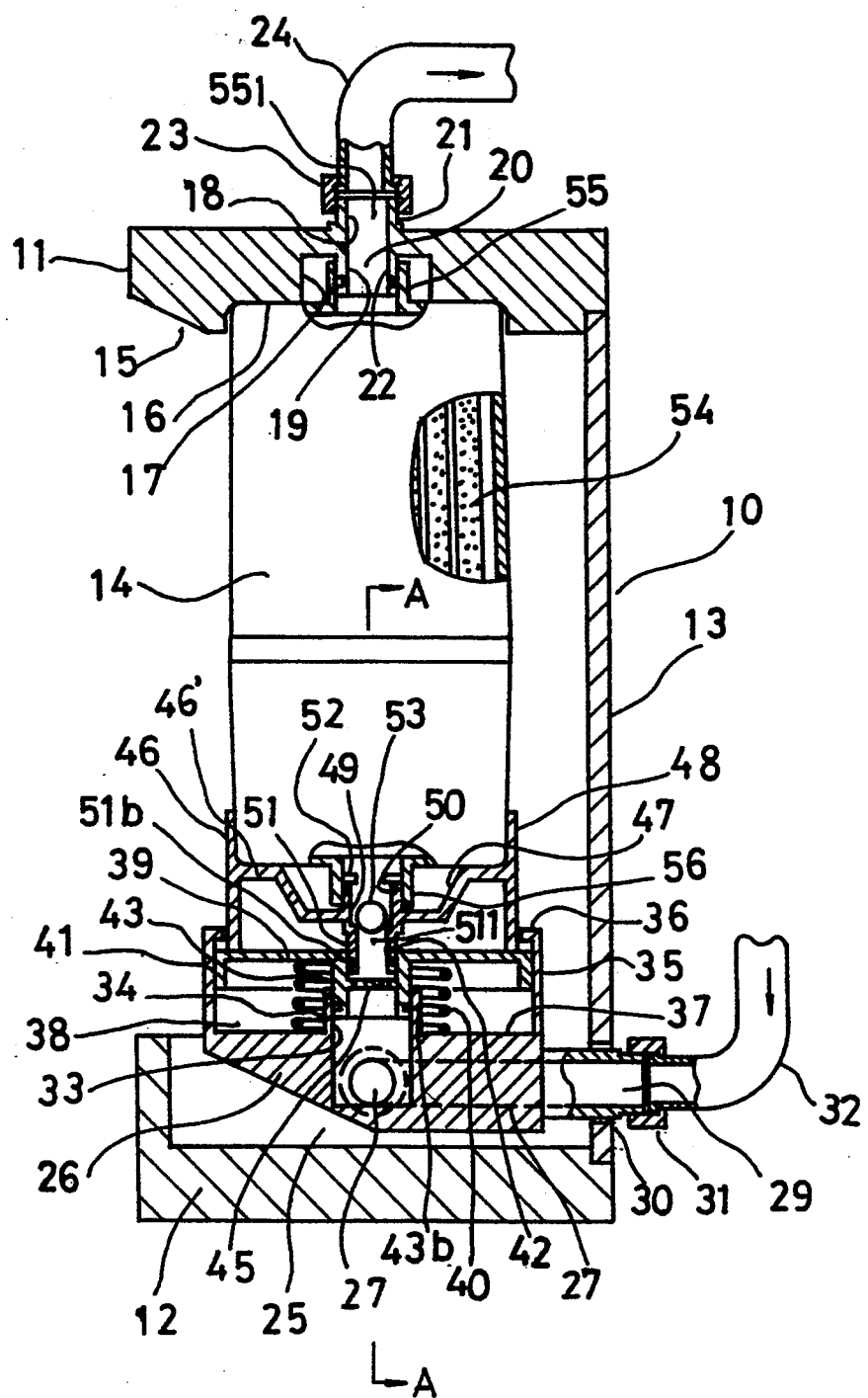
FIG. 1 is a partial sectional elevation view showing one embodiment of filter of the present invention.

In FIG. 1, a housing 10 has an upper cover member 11, a lower cover member 12 and a side wall member 13.

The side wall member 13 is provided with a side opening 15 extending the almost height of the side wall member 13 for installing and taking out a cartridge 14.

[CONSTRUCTION OF HOUSING]

The upper cover member 11 is substantially circular and thin, and the lower face thereof is provided with a first recess 16, and the bottom of the first recess 16 further has a second recess 17 at its center part. These recesses 16 and 17 are concentric with the circumference of the upper cover member 11.

The center of the upper face of the upper cover member 11 and the center of the second recess 17 are respectively provided with an upper opening 18 and a lower opening 19 each having a circular section. These upper and lower openings 18 and 19 communicate each other to form a first channel 20.

The upper opening 18 has on a cylindrical sleeve 21 which protrudes upward from the periphery of the opening 18, and the lower opening 19 is provided with a cylindrical sleeve 22 which projects downward from the periphery of the opening 19. To the sleeve 21, a flexible tube 24 is connected with a coupler 23. Filtered water flows through the upper tube 24 outside the housing.

The opposed peripheral of the upper cover member 11 and the lower cover member 12 are connected to the upper end and the lower end of the side wall member 13 respectively. The lower cover member 12 has, on its upper face, a large recess 25 which opens upward. Inside the recess 25, a supporting base 26 of a substantially cylindrical shape is installed rotatably on a horizontal axis thereof.

Figure 2:
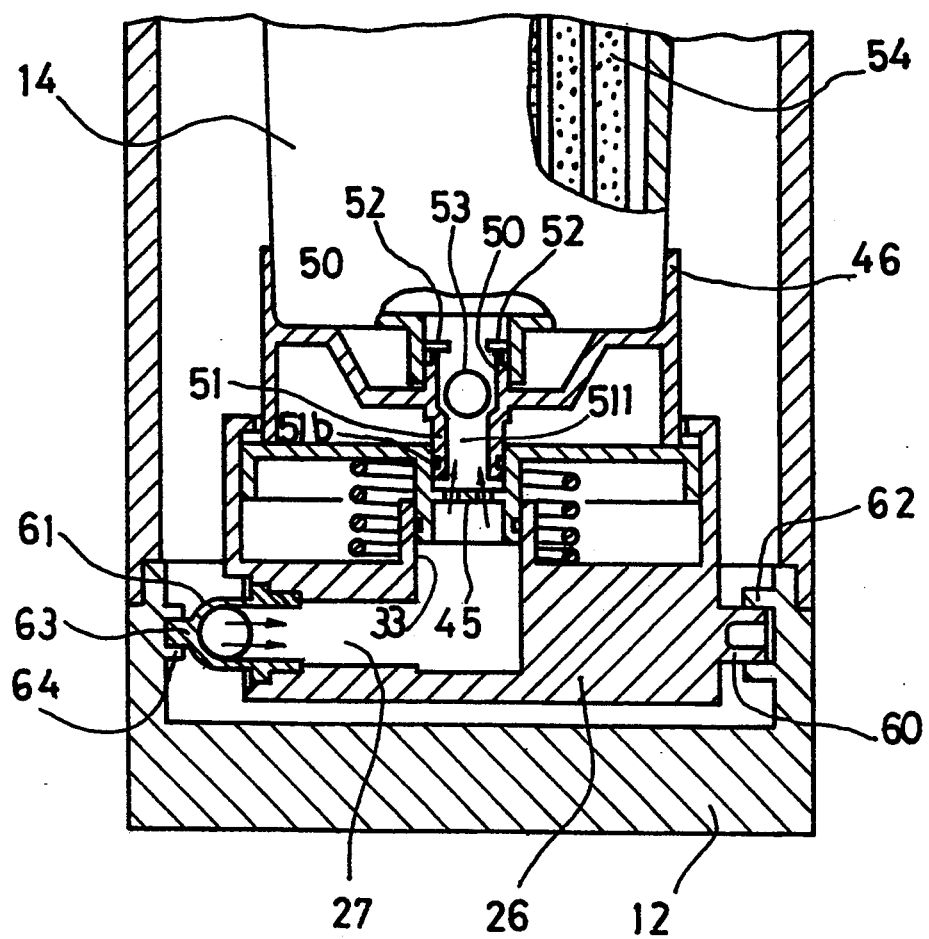
FIG. 2 is a sectional elevation view taken along line A—A of FIG. 1.

Inside the supporting base 26, a channel 27 is provided (see FIG. 2). A cylindrical tube 29, which protrudes from a periphery of a circular opening 28 of one end of the channel 27, projects from the housing 10 through an opening 30 of the side wall member 13. To an end of the tube 29, a flexible tube 32 is connected with coupler 31. Raw water to be filtered flows into the housing via the tube 32.

The upper face center of the supporting base 26 is provided with a circular opening 33, which communicates with the channel 27 in the supporting base. The periphery of the opening 33 has a cylindrical sleeve 34 extending upward. The supporting base 26 has a cylindrical wall 35 which extends vertically from the upper periphery of the base 26. The upper end portion of the wall 35 is provided with a horizontal edge portion 36 which is formed by bending the end portion and horizontally extending it toward the axis of the wall.

A chamber 38 with the upper face 37 is formed in the supporting base 26 and inside of the wall 35. In the chamber 38 defined by the upper face 37, the wall 35, the horizontal edge portion 36 and the outside surface of the sleeve 34, a horizontally disposed plate member 39 is housed in a vertically slidable manner. Beneath the plate member 39, a coil spring 40 is disposed, and the upper end of the coil spring 40 is installed in a manner that the plate member 39 is pressed against the lower face of the horizontal edge portion 36, but the coil spring permits sliding down of the plate member 39 at a pressing down of the plate member.

The periphery of the plate member 39 is mounted on a smoothly finished vertical flange wall 41, so that the plate member 39 can slide upward and downward in said chamber 38, keeping its horizontal posture. Furthermore, a cylindrical sleeve 43, which extends downward from a periphery of a circular opening 42 equipped in the center of the plate member 39, is slidably inserted into the sleeve 34. The lower part of the cylindrical sleeve 43 slidably couples the upper part of the inner face of the sleeve 34 of the supporting base 26.

In addition, on the outer peripheral face of the sleeve 43, a packing 43b made of an elastic material such as rubber is mounted and seals the gap between the sleeve 43 and the sleeve 34 to be liquid-tight.

Figure 6:
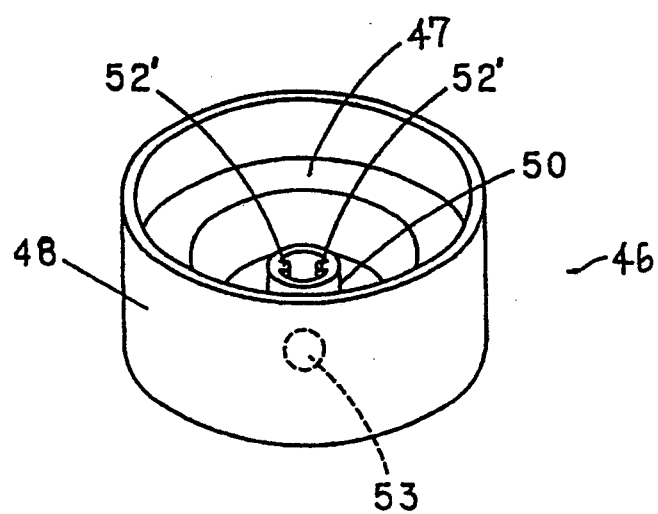
FIG. 6 is a perspective view showing a cartridge mounting base in one embodiment of filters of the present invention.

On the upper face of the plate member 39, a cartridge mounting base 46 is so disposed that it pushes the plate member 39 into the interior of the supporting base 26 when the cartridge 14 is mounted thereon. In FIGS. 1 and 6, the cartridge mounting base 46 has a disk member 47 with a recess in its center and also has a cylindrical side wall 48 which extends from the outer periphery of the disk member 47 upward and downward in the direction of the axis of the disk member.

The center of the recess of the disk member 47 is provided with a circular opening 49. From the periphery of the opening 49, a sleeve 50 extends upward and downward in the direction of the axis of the opening 49. From the lower end of the sleeve 50, a sleeve 51, which has an inner diameter narrower than the sleeve 50, extends downward along the axis of the sleeve 50. This sleeve 51 is inserted into the opening 42 of the plate member 39. On the outer peripheral face of the sleeve 51, a packing 51b made of an elastic material such an rubber is mounted and seals the gap between the sleeves 50 and 51 to be liquid-tight.

Figure 7:
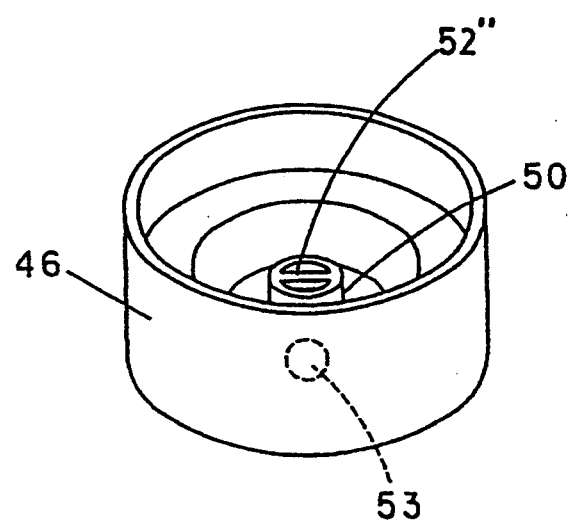
FIG. 7 is a a perspective view showing a cartridge mounting base in another embodiment of filters of the present invention.

The upper edge of the sleeve 50 has two lateral protrusions 52' which horizontally extend inwards toward the center axis of the sleeve 50 as shown in FIG. 6 in enlarged illustration. Alternatively, as shown in FIG. 7, as a modified version of the embodiment, the upper edge of the sleeve 50 may be provided with one protrusion 52" of bridge shape which extends from one upper edge portion to the other opposed upper edge portion crossing the center axis of the sleeve 50.

Furthermore, in the interior channel 511 of the sleeve 50, a sphere 53 as a valve ball is provided in a vertically movable manner, where the stroke of the vertical movement is limited by the lateral protrusions 52 in the upper motion and by the upper end of the smaller diameter sleeve 51 in the lower motion. When the sphere 53 is at the upper end of the sleeve 51, which upper end serves as a valve seat, the channel between the sleeve 50 and the sleeve 51 is closed.

As shown in FIG. 2, the supporting base 26 has protrusions 60 and 61 which protrude radially from its side wall parts on its each-other opposite sides. One protrusion 60 is substantially cylindrical, and inserted into a receiving portion 62 provided on a side of the lower cover member 12; and the other protrusion 61 has a channel 27 inside thereof communicating upwards with the opening 33 of the supporting base 26. The end of the protrusion 61 is provided with a projection 63 which is rotatably inserted into a receiving portion 64 equipped on a side of the lower cover member 12.

As a result of the above-mentioned configuration of the supporting base 26, it can rotate on an axis of a line (not shown) connecting the two receiving portions 62 and 64.

[CONSTRUCTION OF CARTRIDGE]

In FIG. 1, the substantially cylindrical cartridge 14 accommodates a known filter member 54, for example, a combination of a hollow fiber filter and activated carbon granule. On the upper end of the cartridge 14, a sleeve 55, which communicates with the cartridge interior, is provided concentrically with and protrusively above the cartridge 14; and the above-mentioned sleeve 22 of the upper cover member 11 is inserted into the sleeve 55 thereby to couple the latter.

In the state that the sleeve 22 has been inserted into the sleeve 55, the upper face of the cartridge 14 substantially contacts with the inner surface of the recess 16 of the upper cover member 11.

In the center of the lower face of the cartridge 14, a sleeve 56, which communicates with the cartridge interior, is provided concentrically with and protrusively below the cartridge 14; and the upper portion of the sleeve 50 of the cartridge mounting base 46 is inserted into the sleeve 56.

In the state where the sleeve 50 has been inserted into the sleeve 56, the lower face of the cartridge 14 contact with a horizontal ring shaped part 46 of the disk member 47 formed inside the vertical wall of the cartridge mounting base 46.

[INSTALLATION OF CARTRIDGE]

Figure 3:
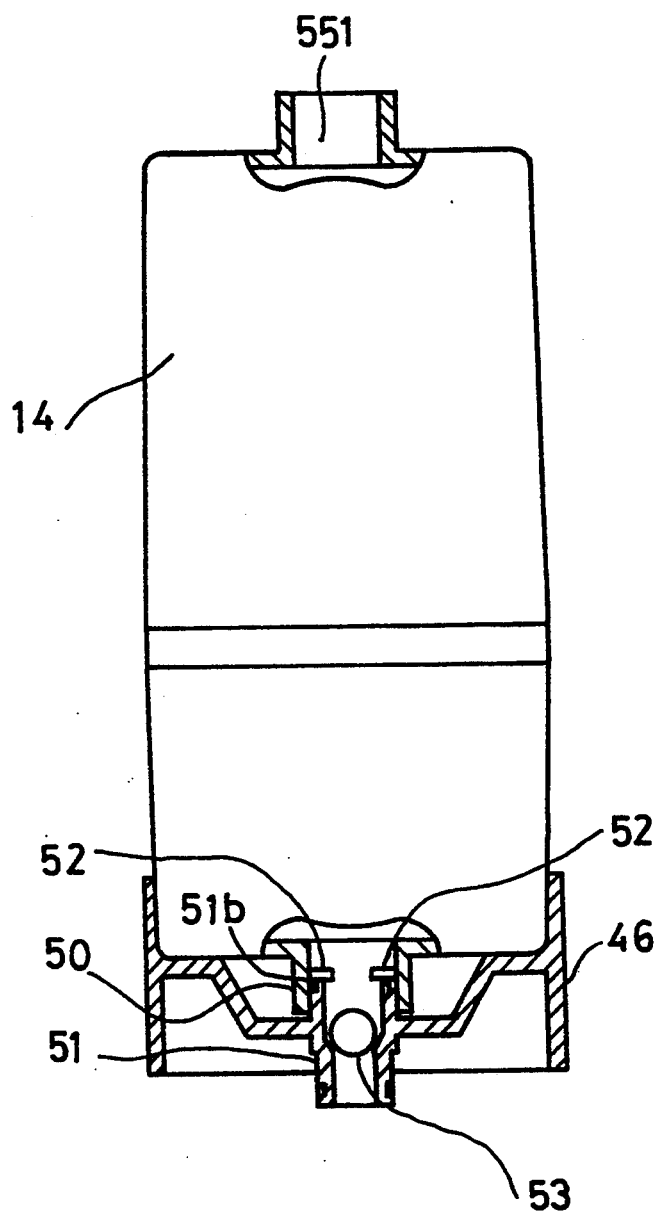
FIG. 3 is an elevation view showing a state that a cartridge is fixed to a cartridge mounting base in one embodiment of filters of the present invention.
Figure 4:
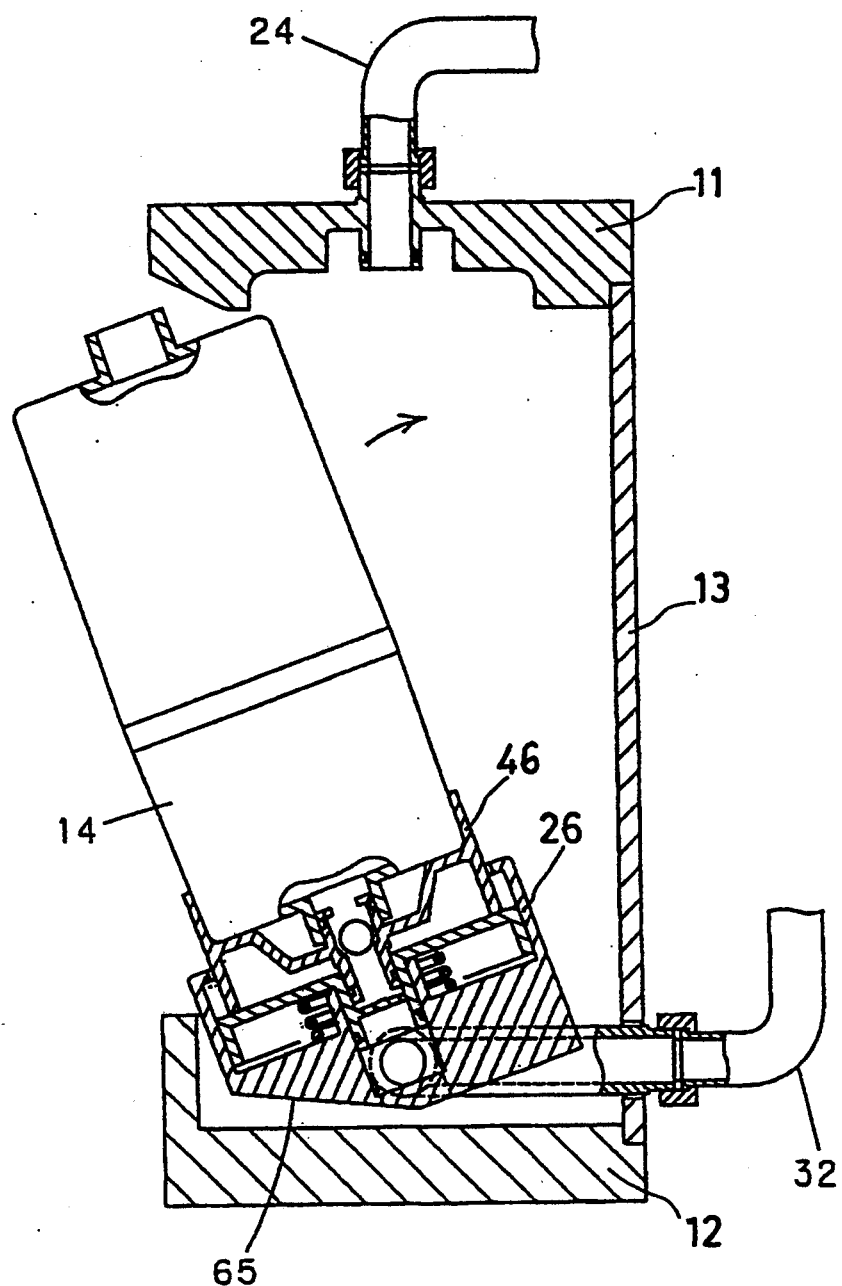
FIG. 4 is a partial sectional elevation view showing a state of fixing a cartridge to a cartridge mounting base in one embodiment of filters of the present invention.

In FIGS. 3 and 4, in order to install the cartridge 14 in the housing 10, first the cartridge mounting base 46 is fixed to the lower portion of the cartridge 14. Then the cartridge mounting base 46 is installed in the housing 10 through the opening 15 of the housing, and the lower end of the cartridge mounting base 46 is pressed to the plate member 39 of the supporting base 26, against a resilience of the spring member 40. Then, the plate member 39 and the supporting base 26 are turned on a side of the opening 15 so that the cartridge is accommodated into the housing 10.

Next, the cartridge mounting base 46 is partially inserted into the chamber 38 of the supporting base 26 by further pressing the cartridge mounting base 46 to the plate member 39. And the cartridge 14 is turned in a manner to be put vertically; and the whole cartridge 14 is housed in the housing 10.

Figure 5:
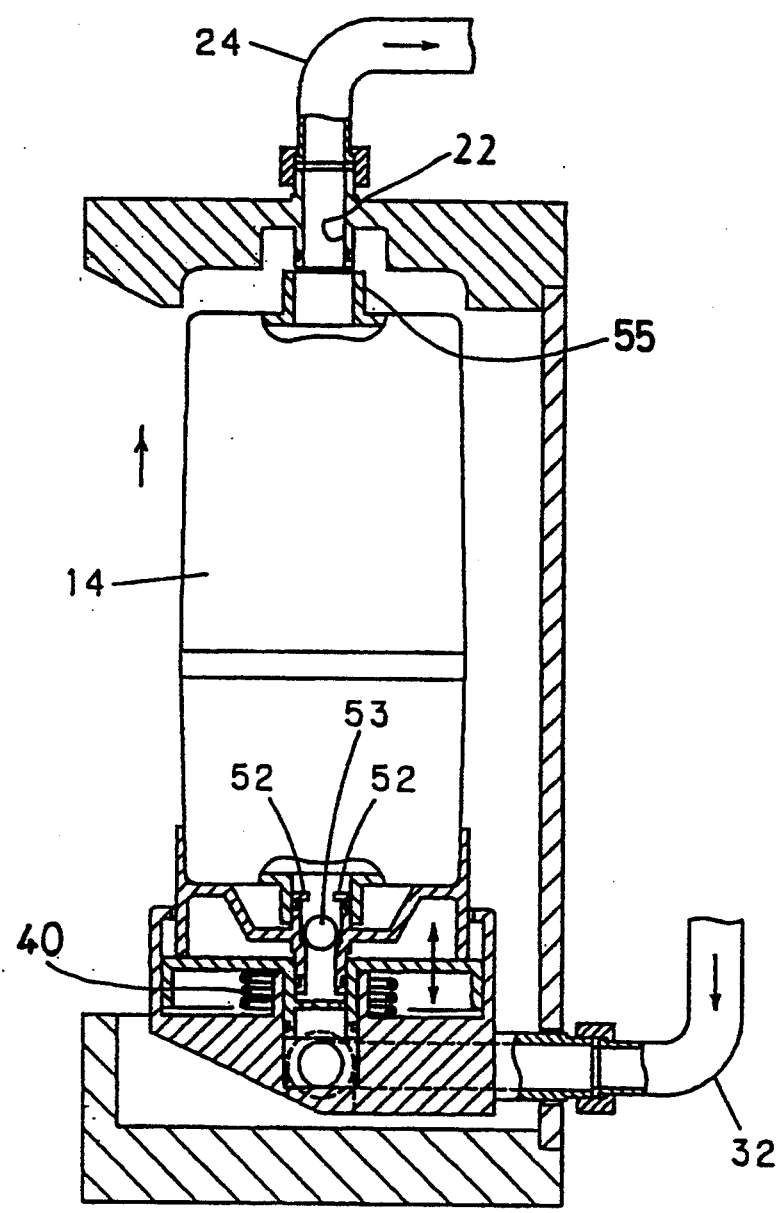
FIG. 5 is a partial sectional elevation view showing a state of fixing a cartridge to a cartridge mounting base in one embodiment of filters of the present invention.

Next, as shown in FIG. 5, the cartridge 14 is lifted up, so as to insert the sleeve 22 of the upper cover member 11 into the sleeve 55 of the cartridge. Thereby the whole cartridge is installed in the housing 10. In this case, the cartridge 14 and the cartridge mounting base 46 are pushed upward by the spring member 40, and they are held in the housing 10 in this state of FIG. 5.

In FIG. 1, in this state of cartridge installation, when raw water is flown in the inflow tube 32, the raw water passes from the inflow tube 32, through the sleeve 29 on the side face of the supporting base 26, the channel 27 in the supporting base 26, the opening 33, the sleeve 34 on the upper face of the supporting base 26, the sleeve 43 of the plate member 39, and the inside of the sleeve 51 of the cartridge mounting member. Then the raw water in the sleeve 51 pushes the sphere 53, and thereby flowing into the cartridge 14 through the sleeve 50 and the sleeve 56 coupling on the lower end of the cartridge.

This raw water running into the cartridge 14 is filtrated by the filter member 54, purified. The resultant filtrated water flows out of the filter housing, and through the sleeve 55 of the cartridge 14, upper end and the sleeves 22 and 21 of the upper cover member, and flows into the outflow tube 24.

[REMOVAL OF CARTRIDGE]

When removing the cartridge 14 from the filter housing, first the cartridge 14 is depressed downward, and the sleeve 55 of the cartridge is removed from the sleeve 22 of the upper cover member. Then the cartridge 14, cartridge mounting base 46 and supporting base 26 are tilted on a side of the opening 15 of the side wall member 13, keeping the state of depressing-down of the cartridge 14; and in this state the cartridge 14 and the cartridge mounting base 46 are removed through the opening 15. At that time, the sphere 53 of the cartridge mounting base 46 is automatically placed on the upper end of the sleeve 51, and the internal channel of the sleeve 51 is closed, thereby to prevent raw water and filtered water above the sphere from outflow. The lower face of the supporting base 26 is provided with a slant portion 65 on a side of the opening 15, so that this enables the cartridge to tilt with a large inclination for removal.

The used cartridge 14 is replaced with a new one by separating therefrom the cartridge mounting base 46.

[ANOTHER EMBODIMENT]

Figure 8:
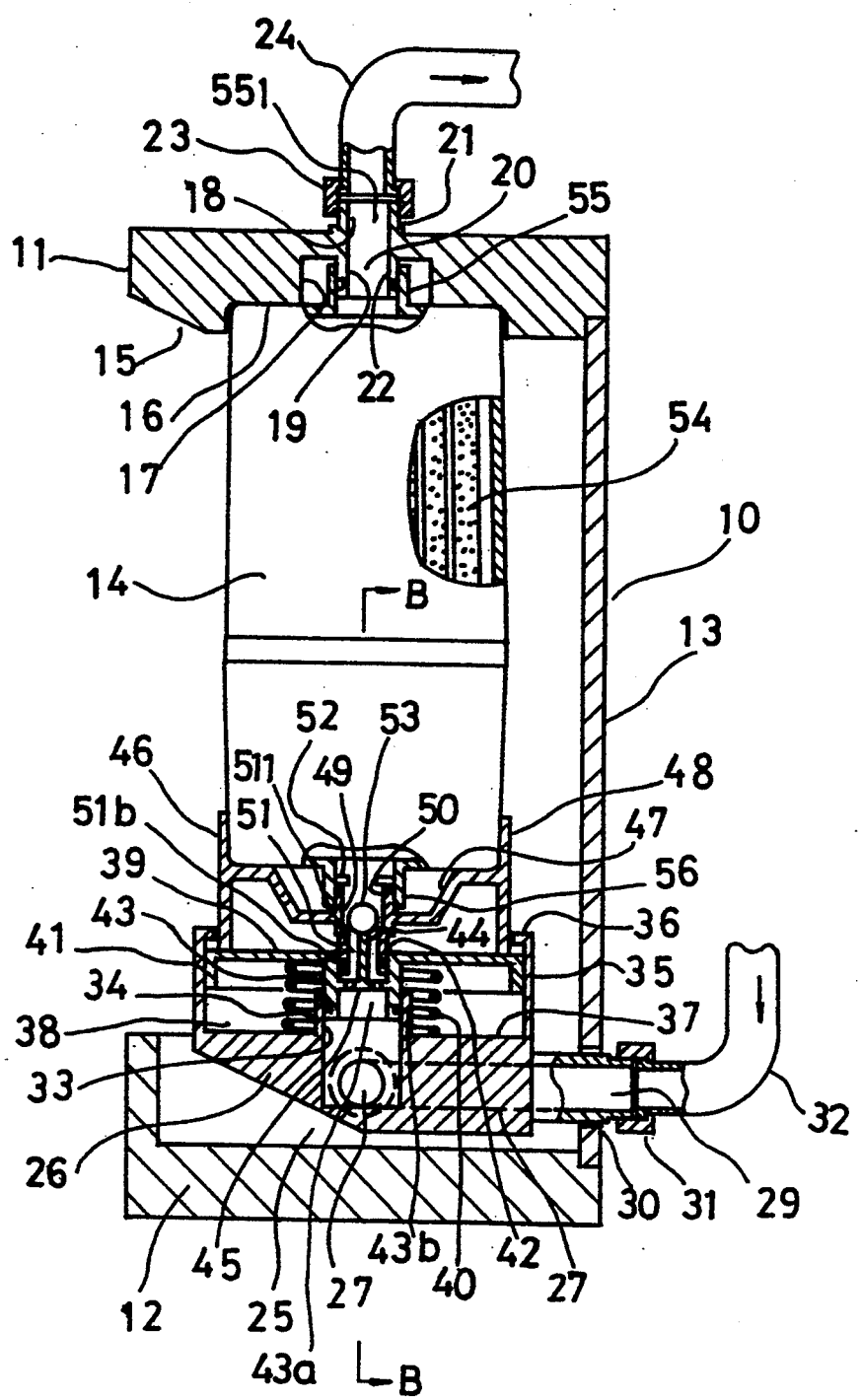
FIG. 8 is a partial sectional elevation view showing another embodiment of filters of the present invention.
Figure 9:
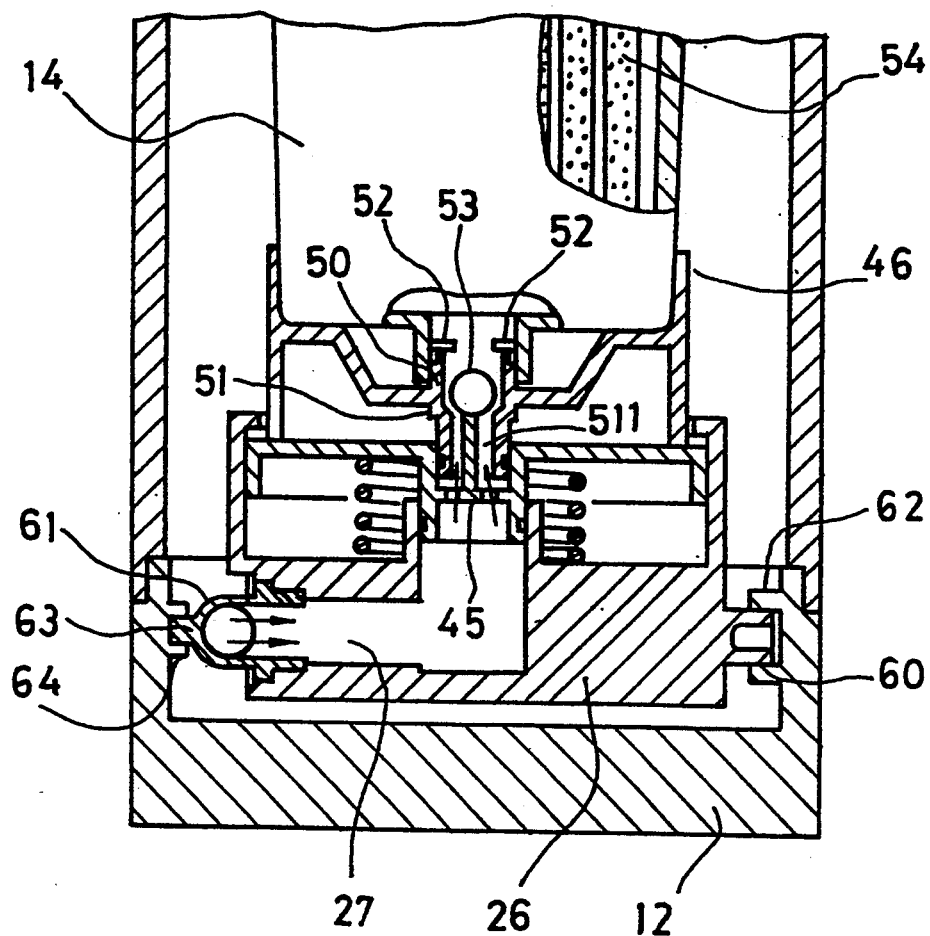
FIG. 9 is an enlarged sectional elevation view taken along line B—B of FIG. 8.
Figure 10:
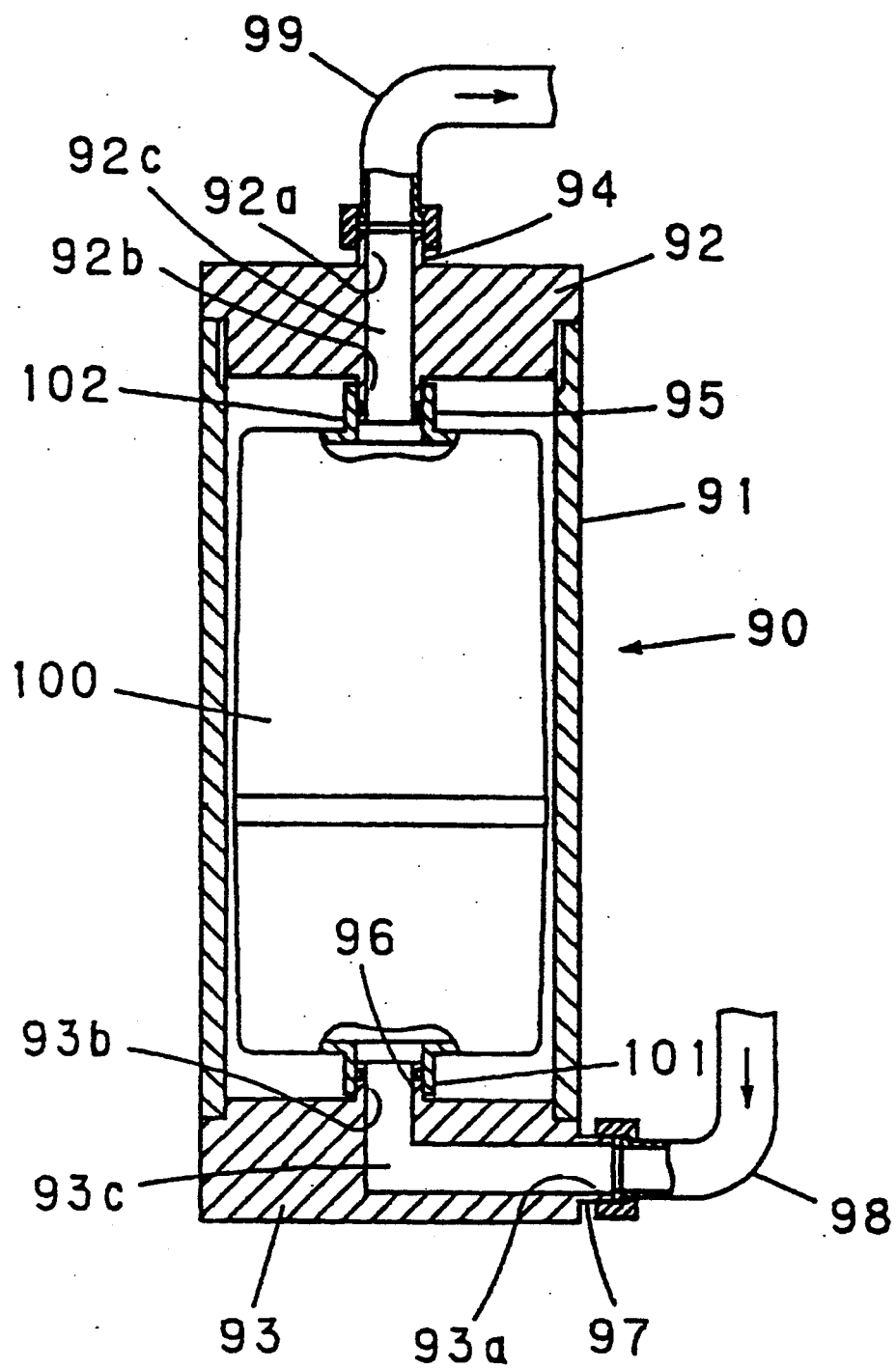
FIG. 10 is a partial sectional view showing a conventional filter.

FIG. 8 shows another embodiment of the present invention. Most components and parts of this embodiment is the same as or similar to the foregoing embodiment, and hence the corresponding parts and components are designated by the same numerals, and the same explanations apply to the corresponding parts. Main difference of this second embodiment is on such a structure that in an internal vertical channel 43a of a sleeve 43 of a supporting base 26, a vertical protrusion 44 is provided in a manner to extend upward along the axis of the sleeve 43 and the lower end of the protrusion 44 is held by a holding member 45 which extends at least from one part of the internal surface of said channel. The protrusion 44 and the holding member 45 are provided in a manner to retain sufficient passage in the internal vertical channel 43a.

In this structure, when a cartridge mounting base 46 is mounted on a plate member 39 of a supporting base 26, the protrusion 44 of the plate member 39 is inserted into interior space of both sleeves 50 and 51. Therefore, the end of the protrusion 44 pushes up a lower portion of a sphere 53 to open the valve.

That is, when the cartridge 14 is mounted on the cartridge mounting base 46 and then the cartridge is inserted through an opening 5 and installed in the device housing 10, the top end of the protrusion 44 pushes up the plate member 39. Therefore, the interior of the cartridge and a channel 27 easily and certainly communicate with each other.

When a used cartridge is replaced and a new cartridge 14 is mounted in the cartridge mounting base 46, this protrusion 44 serves certain and easy releasing of the valve sphere 53 from its closing state, even if a considerable negative pressure exists in a pipe of a channel 29.

Although the present invention has been described in terms of the presently preferred embodiments, it is to be understood that such disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

What is claimed is:

1. A filter comprising:
   a housing having an inflow port and an outflow port;
   a filter member;
   a cartridge for housing said filter member, said cartridge having an inflow port for flowing in raw water at a lower end of said cartridge and an outflow port for flowing out filtered water by said filter member in an upper end of said cartridge, said cartridge being detachably installed in said housing wherein the inflow port of said housing and the inflow port of said cartridge are coupled and the outflow port of said housing and the outflow port of said cartridge are coupled, said housing further comprising:
- a cartridge mounting member having a channel therein;
- a valve member in said channel for preventing water from flowing from an upstream position to a downstream position, the cartridge mounting member detachably coupling: (1) the inflow port of said cartridge and an output port of said channel upstream of said valve member, and (2) the inflow port of said housing and an inflow end of said channel downstream of said valve member;
- a wall having an opening for removably locating said cartridge within said housing; and
- a supporting member located within said housing having a channel therein for coupling the inflow port of said housing and said inflow end of said cartridge mounting member, said supporting member being rotatable about a horizontal axis so that said cartridge can be removed by way of said opening.

2. The filter according to claim 1, where in said valve member comprises:
- a valve ball, a valve seat and a vertical protrusion which is provided vertically upward in the channel of said cartridge mounting member, wherein the protrusion pushes up the valve ball when said cartridge mounting member is mounted on said supporting member.

3. A filter comprising:
a housing having an inflow port and an outflow port;
a filter member;
a cartridge which houses said filter member, said cartridge having an inflow port for flowing in raw water at a lower end of said cartridge and an outflow port for flowing out filtered water by said filter member in an upper end of said cartridge,
said cartridge being detachably installed in said housing wherein the inflow port of said housing and the inflow port of said cartridge are coupled and the outflow port of said housing and the outflow port of said cartridge are coupled, said housing further comprising:
- a cartridge mounting member having a channel therein;
- a valve member in said channel for preventing water from flowing from an upstream position to a downstream position;
- said cartridge mounting member detachably coupling: (1) the inflow port of said cartridge and an output port of said channel upstream of said valve member, and (2) the inflow port of said housing and an inflow end of said channel downstream of said valve member; and
- a rotatable supporting member for supporting said cartridge mounting member in said housing, said supporting member having a valve-releasing member which releases said valve when said cartridge mounting member with said cartridge thereon is supported by said supporting member.

4. The filter according to claim 3, wherein
said housing further comprises a wall having an opening for removably locating said cartridge therewithin.

5. The filter according to claim 4, wherein
said supporting member has therein a channel for coupling the inflow port of said housing and said inflow end of said cartridge mounting member, and said supporting member is rotatable about a horizontal axis so that said cartridge is removable from said housing by way of said opening.

6. The filter according to claim 3 wherein
said valve member comprises a valve ball and a valve seat, and
said valve-releasing member comprises a protrusion which is provided vertically upward in the channel of said cartridge mounting member wherein said protrusion pushes up the valve ball when said cartridge mounting member is mounted on said supporting member.

* * * * *